June 19, 1934.    J. M. SIMPSON    1,963,387
TRANSMISSION SHIFT
Filed Sept. 28, 1932
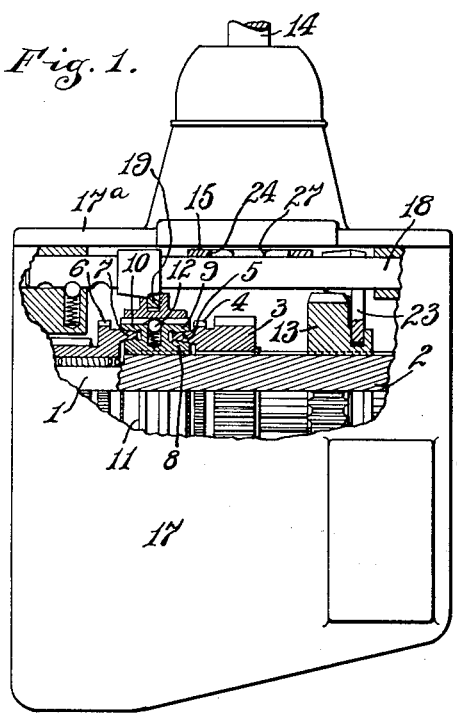
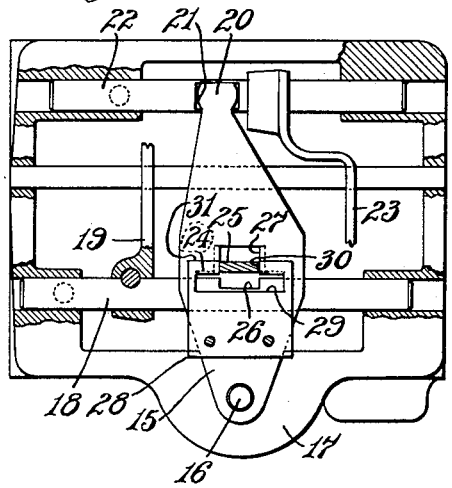
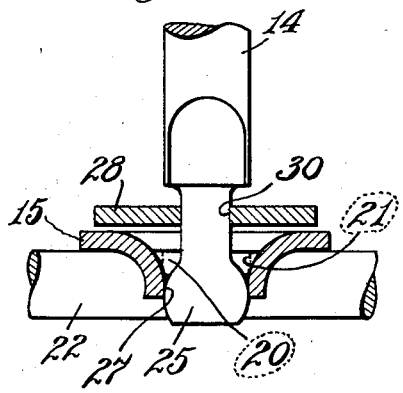
INVENTOR.
John M. Simpson,
BY Hood + Hahn.
ATTORNEYS Patented June 19, 1934

UNITED STATES PATENT OFFICE 1,963,387

TRANSMISSION SHIFT

John M. Simpson, Muncie, Ind., assignor to Warner Gear Company, Muncie, Ind., a corporation of Indiana Application September 28, 1932, Serial No. 635,203

2 Claims. (Cl. 74—473)

My invention relates to improvements in shifting mechanism for automobile transmissions and has for one of its objects the provision of means whereby with the same amplitude of movement of the shafting lever different shiftable members of the transmission may be given different amplitudes of movement.

A further object of my invention is to provide means whereby shiftable members of a transmission requiring variable force for operating the same may be operated without varying the force applied by the operator to the shifting lever.

For the purpose of disclosing my invention I have illustrated an embodiment thereof in the accompanying drawing, in which;

Fig. 1 is a side elevation partially broken away of a shifting mechanism embodying my invention;

Fig. 2 is an end elevation thereof partially broken away;

Fig. 3 is a plan view of the shifting mechanism; and

Fig. 4 is a detail sectional view.

The shifting mechanism may be applied to various types of transmissions having various types of shiftable members. For the purpose of disclosing my invention however I have shown the mechanism applied to one type of structure wherein the shiftable members for controlling the operation of high and second speeds have a shorter range of movement and require a greater application of force to shift the same than that required by the mechanism for operating the vehicle in low and reverse speeds.

In the type illustrated there is provided a driving shaft 1 and a driven shaft 2. On the driven shaft 2 I provide a second speed gear 3 rotatably mounted on the shaft and driven from the usual countershaft connection with the drive shaft 1. This gear 3 is provided with clutch teeth 4 and one member 5 of a cone clutch. The drive shaft 1 is provided with clutch teeth 6 and one member 7 of a cone clutch. Splined on the shaft 2 between the cone clutch members 5 and 7 is a hub 8 having formed in its opposite faces cone clutch members 9 and 10 for cooperation respectively with the cone clutch members 5 and 7. This hub member on its periphery is provided with splined teeth on which is splinedly mounted a clutch collar 11 having internal teeth cooperating with the teeth on the hub member and adapted to be moved into engagement with either the teeth 4 or the teeth 6. The hub member and the collar are resiliently connected together by suitable spring pressed poppets 12.

In operation, when it is desired to drive the vehicle at second speed the clutch collar 11 is shifted to the right, looking at Fig. 1, first engaging the cone clutches which tend to synchronize the speed of the shaft 2 with the speed of the gear 3. A continued movement of the clutch collar 11 releases the same from its resilient connection with the hub and permits the internal teeth of the clutch collar to mesh with the teeth 4 on the gear 3 thereby positively locking the gear 3 to the shaft 2. A shift to the left, looking at Fig. 1, of the collar 11 would, in the same manner, connect the shafts 1 and 2 directly.

In addition to the mechanism for second and high speed drive, a gear 13 is splined on the shaft 2 and this gear is adapted to be moved into mesh with a low speed gear on the countershaft, as is usual in such cases, or with an idler driven from the countershaft for operating the shaft 2 in reverse direction. As the extent of the movement of the gear 13 on the shaft 2 is greater than the extent of movement of the collar 11, it is desirable that means be provided whereby, with the same amplitude of movement of the shift lever 14 as is necessary for shifting the collar 11, the operator may be able to shift the gear 13. Furthermore, as the force required for shifting the gear 13 is less than that required for shifting the collar 11, it is desirable that some means be provided whereby the force exerted by the operator on the shift lever 14 be reduced when applied to the shifting of the gear 13. To this end I provide a mechanism for amplifying the movement of the shift lever as applied to the gear 13 and reducing the power thereof. The particular structure which I have illustrated comprises a horizontally disposed lever 15 pivoted as at 16 on the upper face of the transmission casing 17. This lever extends across the top of the shift rail 18 carrying the shift fork 19 for operating the collar 11 and has its opposite end provided with a ball-shaped or rounded portion 20 adapted to engage in the operating slot 21 of a shift rail 22. This shift rail 22 is provided with the operating fork 23 for manipulating the gear 13. The lever 15 is provided with a longitudinally extending slot 24 through which the lower end 25 of the shift lever 14 is adapted to extend to engage in a notch 26 in the side of the shift rail 18. This slot 24 is sufficiently long to permit the shift lever to operate the shift rail 18 for shifting the collar 11 in either direction to the full limit of its movement without affecting or contacting with the lever 15. A shorter slot 27 in the lever 15 meets or merges into the longer slot 24 so that when the lower end 25 of the shift lever is moved to the right, looking at Fig. 2, or toward the top, looking at Fig. 3, it will engage in the slot 27 and by shifting the same forward or backward the lever 15 will be swung on its pivot pin 16 and thereby shift the rail 22.

By this arrangement the movement of the lower end 25 of the shift lever 14 is multiplied by the lever 15 to thereby increase the movement of the shift rail 22 without increasing the amplitude of movement of the shift lever 14.

However, due to the fact that the shift lever 14 engages the lever 15 between its pivot point 16 and its connecting point with the shift rail 22, the shifting force of the lever 14 on the rail 22 is reduced. By this arrangement, I am enabled to maintain the amplitude of movement of the upper end of the shift lever and the force applied thereto equal irrespective of the shifting mechanism of the transmission to which it is applied.

In order to prevent the operation of the lever 15 when the shift lever 14 is in neutral position, even though the lower end thereof is positioned in the slot 27, I provide a blocking plate 28 rigidly secured to the underside of the top 17ª of the case and lying over the lever 15. This plate has formed therein a slot 29 coincident with the slot 24 in the lever and a slot 30 overlying the slot 27. However, the end 31 of the plate stops short of the end wall of the slot 27 a sufficient distance to permit the lower end of the lever 25 to engage in this slot 27 beyond the plate 28. Therefore, when the shift lever is in neutral position it will be blocked from movement by the walls of the slot 30. If, however, it is shifted towards the bottom, looking at Fig. 3, it will move into the slot 29 and may therefore shift the rail 18. If it is moved to the top, looking at Fig. 3, it will move beyond the end wall 31 of the plate and be free to shift the lever 15.

I claim as my invention:

1. In a transmission, the combination with a driving shaft and a driven shaft, of two sets of gear trains including intermeshable elements for drivingly connecting said shafts, a pair of shift rods, means respectively on said shift rods for operating the intermeshable elements of said two gear trains, one of the shift rods being directly engageable by said shift lever, and a lever mechanism interposed between the other shift rod and the shift lever for multiplying the range of movement of said shift lever and engageable by said shift lever at the same distance from its fulcrum point as the first shift rod.

2. In a transmission, the combination with a driving shaft and a driven shaft, of two gear trains including intermeshable elements for drivingly connecting said shafts, a shift lever, operating means for the intermeshable elements of one of said gear trains engageable by said shift lever, operating means for the intermeshable elements of the other gear train and a pivoted lever connected with said operating means and engageable by said shift lever at the same distance from its fulcrum point as said first-mentioned operating means and intermediate of the pivot point of said pivoted lever and its point of connection with the operating means.

JOHN M. SIMPSON.